Jan. 11, 1966     J. W. BLAIR     3,228,194
SPLIT SYSTEM INDICATING MEANS
Filed Feb. 17, 1965
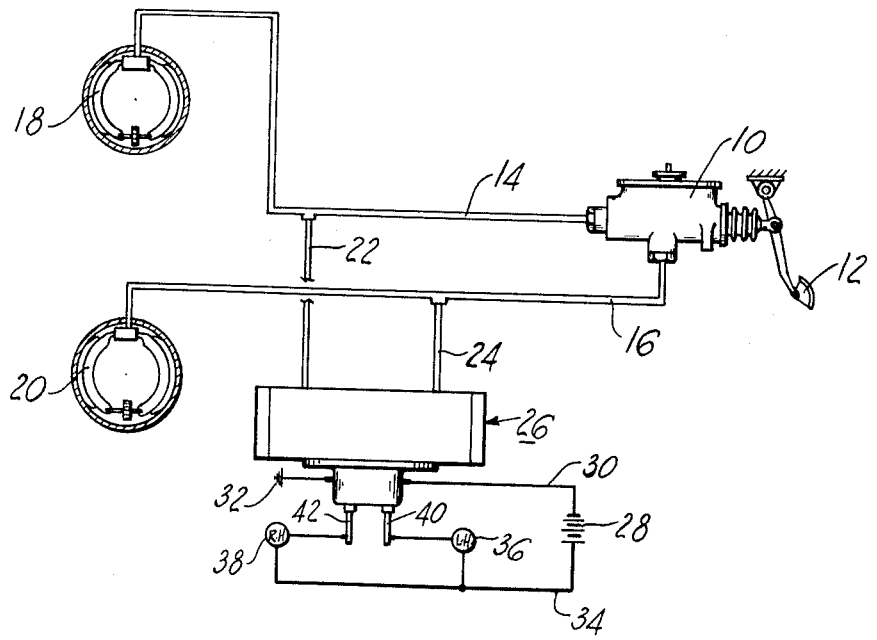
_Fig. 1_
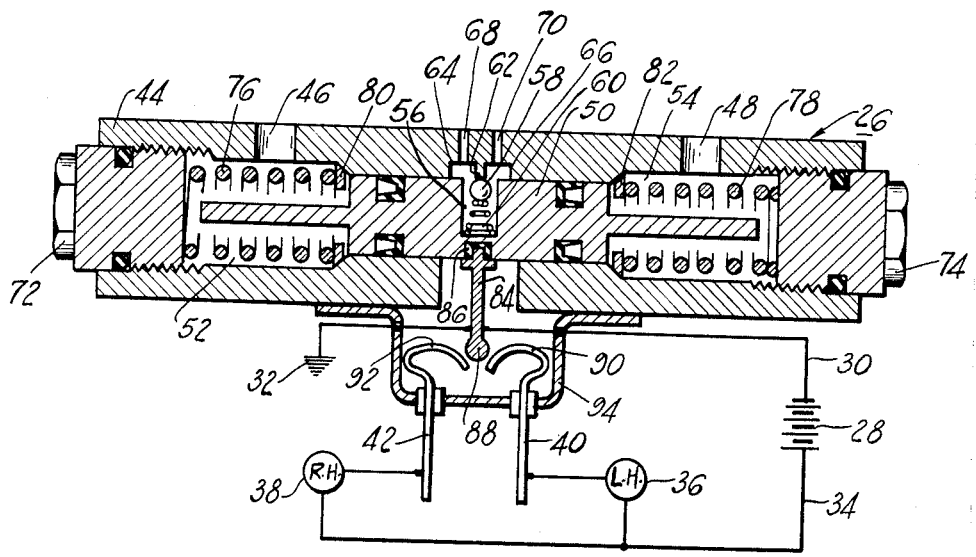
_Fig. 2_
INVENTOR.
JOHN W. BLAIR
BY
ATTORNEY

United States Patent Office 3,228,194
Patented Jan. 11, 1966

3,228,194
SPLIT SYSTEM INDICATING MEANS
John W. Blair, South Bend, Ind., assignor to The Bendix Corporation, South Bend, Ind., a corporation of Delaware
Filed Feb. 17, 1965, Ser. No. 433,376
5 Claims. (Cl. 60—54.5)

This invention relates to hydraulic pressure systems for controlling the brake mechanisms of automotive vehicles and other types of equipment employing braking mechanisms. More particularly, the invention relates to a hydraulic pressure system employing a split system type master cylinder with signalling means connected therewith to warn the operator of any impending failure in either or both of the systems leading to either a front or a rear brake, respectively.

It is a principal object of this invention to provide an indicating means operatively inserted in a braking system between a master cylinder and a wheel brake, which indicating means is pressure sensitive for actuating a signal upon reduction of pressure in the wheel brakes through breakage or leakage in the system.

Another object of this invention is to provide an automatic circuit closing means which is adapted to be interposed in a hydraulic brake system which may be readily adjusted to effect closing of the signal circuit at a predetermined reduction of pressure in the hydraulic brake system.

Still another object of my invention is to provide an indicating means of the aforesaid type in a split system which employs a pressure responsive means that is operatively connected to each of at least two independent pressures, so that upon the failure of one of the pressures, the other will actuate the pressure responsive means to provide a failure indication.

A still further object of my invention is to provide an indicating means of the aforsesaid type having an automatic locking means for holding the indicating means in to close a circuit and indicate a failure until the failure has been corrected and the indicating means reset by further means that are provided.

Further objects and advantages of my invention will appear to those skilled in the art to which my invention relates from the following description of the accompanying drawing in which:

FIGURE 1 is a schematic brake system employing an indicating means of the type as embodies the features of my invention; and FIGURE 2 is a cross-sectional view of an indicating means in accordance with the principles of my invention to which is added a schematic electrical system to better understand the function thereof.

With regard to the drawing, the split master cylinder 10 is operatively connected to a brake pedal 12 to supply independent pressurized fluid to conduits 14 and 16 leading to a front braking mechanism 18 and a rear braking mechanism 20, respectively.

However, the conduits 14 and 16 are communicated to branch conduits 22 and 24 which lead to an indicating means 26 designed in accordance with the principles of my invention.

The indicating means 26 is further connected to an electrical source 28 by means of a "ground" wire 30 communicating with a ground 32 through my indicating means and a "hot" wire 34 communicating with dashboard lights 36 and 38 and through the lights to contacts 40 and 42 projecting from the indicating means 26.

With reference to FIGURE 2, the indicating means 26 is shown to be constructed to have a tubular housing 44 with a front brake system inlet 46 and a rear brake system inlet 48 communicating an internal bore of the housing 44 on either side of a piston 50 that separates the internal bore into a front brake system variable volume chamber 52 and a rear brake system variable volume chamber 54. The piston is provided with a radical bore 56 centrally thereof in which a latching means in the form of a ball check 58 is biased by a spring 60 to impinge upon a depending projection 62 of the housing between radial grooves 64 and 66 that are opened externally of the housing by means of radial drilled openings 68 and 70, respectively. Each end of the tubular housing 44 is closed by means of plugs 72 and 74 that are threaded to the housing 44 so as to be adjustable as to the depth they may be inserted into the bore of housing 44. Between the plugs 72 and 74 and the piston 50 I have utilized two springs 76 and 78 which are adjustably compressed by means of plugs 72 and 74, respectively. The springs 76 and 78 bear at one end upon the plugs 72 and 74 and at the inner ends upon spring bearing plates 80 and 82, respectively, which are arranged in the housing 44 to impede the translatory motion of piston 50 within the bore thereof toward either of the plugs 72 or 74. On the side of the piston 50, opposite from the ball check 58, I have mounted a switch contact 84 in an insulator 86. As seen, the ground wire 30 is connected to the contact 84 and through the contact to the ground 32. The contact is provided with a bulbous head 88 at its furthermost end projecting from the piston 50. In addition, the contacts 40 and 42 are provided with spring fingers 90 and 92 within a housing 94 attached to the housing 44, which fingers project upwardly to impede the contact 84 in its motion to the right or left as viewed in FIGURE 2.

As may be expected in most split system type master cylinders today, there is a pressure differential between the forward bore and the rear bore thereof which in use with heretofore contemplated indicating means could create a false indication of a failure in that the highest pressure would translate the piston 50 to provide such an indication. However, I have provided means to compensate for unbalance in a split master cylinder in that plugs 72 and 74 may be screwed in or out to vary the spring forces acting upon the plates 80 and 82. Thus, spring 76 may be stiffened with respect to spring 78.

In operation, the operator of a vehicle depresses the brake pedal 12 to actuate the split master cylinder 10 sending independent pressures through conduits 14 and 16 to the wheel brake mechanisms 18 and 20 and by means of branch conduits 22 and 24 to the chambers 52 and 54 of the indicator housing 44. So long as the piston 50 is not forced to compress either of the springs 76 or 78, the ball check 58 will remain abutting the depending projection 62. However, upon a failure in either one of the brake systems 18 or 20, as would be caused by line breakage, leakage, etc., the pressure in the opposing chamber would cause the piston 50 to compress the opposite spring thereby moving the piston so that the ball check 58 will be forced upwardly into one or the other of grooves 64 or 66; and at the same time the contact 84 will impinge upon either of the fingers 90 or 92 to close the circuit for one or the other of the indicators 36 or 38. A probe may be inserted into holes 68 and 70 to lower the ball check 58 and allow springs 76 and 78 to recenter the piston 50 to reactivate the warning device after repairs have been made.

The invention is not to be limited to or by details of construction of the particular embodiment thereof illustrated by the drawing, as various other forms of the device will of course be apparent to those skilled in the art without departing from the spirit of the invention or the scope of the claims.

I claim:
1. A hydraulic system for the brakes of an automotive vehicle and the like, the combination with front and rear hydraulic brake mechanisms, of a split system type master cylinder unit including an indicating means, said indicating means comprising:

- a housing having a longitudinal bore therein which is closed at either end by means of plugs that are threaded to the housing, said housing having a first fluid inlet and a second fluid inlet respectively connected to said front and said rear hydraulic brake mechanisms;
- a piston in the bore of said housing intermediate said plugs to divide said housing into a front variable volume chamber and a rear variable volume chamber that is open to said first inlet and said second inlet;
- a first means in said front variable volume chamber operatively biased by said plug means to impede movement of said piston toward said front variable volume chamber;
- a second means in said second variable volume chamber operatively biased by said plug means in said housing to impede motion of said piston toward said second variable volume chamber;
- a locking means operatively connected to said piston and to said tubular housing of said indicating means for holding said piston in a translated position to either side of the center location of said piston in said housing of said indicating means;
- a switch contact means operatively connected to said piston and projecting from said housing, said switch contact means being centered with respect to a first finger and a second finger that are operatively connected to a first indicating means and a second indicating means respectively; and
- an electrical circuit operatively connected to said contact means depending from said piston and to said indicating means such that when said contact engages one of said fingers one of said indicating means is in closed circuit communication with a power source to thereby provide an indication of a failure.

2. An indicating means according to claim 1 and further comprising means on each face of said piston in said first variable volume chamber and in said second variable volume chamber for limiting movement of said piston toward said first variable volume chamber and toward said second variable volume chamber.

3. An indicating means according to claim 1 and further comprising
   means in said housing of said indicating means to release said locking means after the translation of said piston means and upon the correction of the condition which caused the translation of said piston means.

4. An indicating means according to claim 1 wherein said locking means may be characterized as a ball check that is biased by a spring to abut a projection centered with respect to grooves in said housing of said indicating means.

5. An indicating means according to claim 1 and further comprising:
   a spring;
   a bearing plate operatively connected to said spring and normally spaced from the end of said piston adjacent said front variable volume chamber and in such position abutting a shoulder in the housing of said indicating means; and
   adjustable means operatively connected to said spring to regulate forces acting on said bearing plate.

No references cited.

SAMUEL LEVINE, *Primary Examiner.*